(12) United States Patent
Ditscher et al.

(10) Patent No.: US 8,332,067 B2
(45) Date of Patent: Dec. 11, 2012

(54) DEVICE AND METHOD FOR PROCESSING A ROBOT CONTROL PROGRAM

(75) Inventors: Christof Ditscher, Bann (DE); Ulrich Huggenberger, Augsburg (DE); Thomas Stumpfegger, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 881 days.

(21) Appl. No.: 12/298,674

(22) PCT Filed: May 11, 2007

(86) PCT No.: PCT/EP2007/004170
§ 371 (c)(1),
(2), (4) Date: Mar. 10, 2009

(87) PCT Pub. No.: WO2007/131711
PCT Pub. Date: Nov. 22, 2007

(65) Prior Publication Data
US 2009/0299526 A1    Dec. 3, 2009

(30) Foreign Application Priority Data

May 13, 2006   (DE) .......................... 10 2006 022 483

(51) Int. Cl.
G06F 19/00    (2011.01)
(52) U.S. Cl. ...................................................... 700/245
(58) Field of Classification Search .................. 700/264
See application file for complete search history.

(56) References Cited

U.S. PATENT DOCUMENTS

| | | | | |
|---|---|---|---|---|
| 3,920,972 A | * | 11/1975 | Corwin et al. | 700/251 |
| 4,648,024 A | * | 3/1987 | Kato et al. | 700/187 |
| 4,771,222 A | * | 9/1988 | Nakashima et al. | 318/572 |
| 4,823,279 A | * | 4/1989 | Perzley et al. | 700/251 |
| 4,879,663 A | * | 11/1989 | Fuehrer | 700/250 |
| 4,888,708 A | * | 12/1989 | Brantmark et al. | 700/264 |
| 5,159,249 A | * | 10/1992 | Megherbi | 318/568.1 |
| 5,231,693 A | * | 7/1993 | Backes et al. | 700/264 |
| 5,241,249 A | * | 8/1993 | Detriche | 318/568.11 |
| 5,287,049 A | * | 2/1994 | Olomski et al. | 318/568.1 |
| 5,530,791 A | * | 6/1996 | Okabayashi | 700/255 |
| 5,602,968 A | * | 2/1997 | Volpe | 700/262 |
| 5,608,618 A | * | 3/1997 | Kosaka et al. | 700/61 |
| 5,748,854 A | * | 5/1998 | Watanabe et al. | 700/258 |
| 5,835,684 A | * | 11/1998 | Bourne et al. | 700/255 |

(Continued)

FOREIGN PATENT DOCUMENTS

JP         6099377          4/1992
WO    WO 2005/120759    12/2005

Primary Examiner — Khoi Tran
Assistant Examiner — Bhavesh V Amin
(74) Attorney, Agent, or Firm — Schiff Hardin LLP

(57) ABSTRACT

In a computerized device for processing a robot control program, at least one local area of a robot path of a robot is displayed at a display screen, the robot path containing a support point that is to be modified. The display screen also shows the support point, as well as a path course therethrough and at least one direction also proceeding through the support point perpendicularly to the path course. An input device allows a user to modify the path course by modifying the position of the support at the display screen.

22 Claims, 3 Drawing Sheets

U.S. PATENT DOCUMENTS

| | | | |
|---|---|---|---|
| 5,889,926 A * | 3/1999 | Bourne et al. | 700/255 |
| 5,937,143 A | 8/1999 | Watanabe et al. | |
| 5,980,082 A * | 11/1999 | Watanabe et al. | 700/86 |
| 6,167,328 A | 12/2000 | Takaoka et al. | |
| 6,222,338 B1 * | 4/2001 | Villaret | 318/568.13 |
| 6,266,570 B1 | 7/2001 | Höcherl et al. | |
| 6,317,651 B1 * | 11/2001 | Gerstenberger et al. | 700/245 |
| 6,434,448 B1 * | 8/2002 | Kosaka et al. | 700/245 |
| 6,535,793 B2 * | 3/2003 | Allard | 700/259 |
| 6,585,561 B2 * | 7/2003 | Tokutake et al. | 451/5 |
| 6,822,412 B1 * | 11/2004 | Gan et al. | 318/568.19 |
| 6,832,128 B2 | 12/2004 | Haupt | |
| 6,845,297 B2 * | 1/2005 | Allard | 700/259 |
| 7,211,978 B2 * | 5/2007 | Chang et al. | 318/568.11 |
| 7,298,385 B2 | 11/2007 | Kazi et al. | |
| 7,353,081 B2 * | 4/2008 | Skourup et al. | 700/245 |
| 7,376,488 B2 * | 5/2008 | Watanabe et al. | 700/264 |
| 7,447,615 B2 * | 11/2008 | Watanabe et al. | 703/7 |
| 7,643,905 B2 * | 1/2010 | Watanabe et al. | 700/253 |
| 7,953,509 B2 * | 5/2011 | Murayama | 700/114 |
| 2004/0189675 A1 * | 9/2004 | Pretlove et al. | 345/633 |
| 2004/0193321 A1 * | 9/2004 | Anfindsen et al. | 700/257 |
| 2004/0251866 A1 * | 12/2004 | Gan et al. | 318/568.11 |
| 2005/0096892 A1 * | 5/2005 | Watanabe et al. | 703/7 |
| 2005/0149231 A1 * | 7/2005 | Pretlove et al. | 700/264 |
| 2006/0025890 A1 | 2/2006 | Nagatsuka et al. | |

* cited by examiner

DEVICE AND METHOD FOR PROCESSING A ROBOT CONTROL PROGRAM

BACKGROUND OF THE INVENTION

1. Field of the Invention

The invention concerns a device and a method for processing a robot control program.

2. Description of the Prior Art

The movement path of the center of a tool connected with the robot (thus the tool center point (TCP)) is designated as a robot path of a robot while, insofar as the position of the robot itself is discussed in the following, the position of the base or the pedestal of the robot or, respectively, of the zero point of the robot or global coordinate system is designated relative to the path. The points in the path course that have been taught or programmed offline and normally serve as support points for interpolation of the goods course between these points (for example in the scope of a spine interpolation) are designated as support points of a robot path or, respectively, a path course.

EP 0 852 346 discloses a device to display a robot program, with a memory device to store the robot program; a display device at which a position can be designated with a pointer device; and with a processing device to display a work interval and an air intersection interval as successive lines, with presentation of one of the lines if this is designated by the pointer device, wherein the presentation corresponds to a command for a work priority in the robot program in connection with one of the displayed lines.

Given use of industrial robots, it frequently occurs that data from support points of an existing robot control program (abbreviated as: robot program) must be changed. This can result from a modification requirement for an existing robot program, for example when the module to be processed has been slightly modified. However, point data must also frequently be adapted in order to achieve a required clock time. These point corrections are normally conducted "online", i.e. while the robot program is executed.

In order to conduct such an "online correction" of a point in space, knowledge of a reference system is required of the robot controller. In this simplest case, this is the global coordinate system of the robot. However, an (external) tool coordinate system or an otherwise defined coordinate system is also frequently used. A point correction can then be conducted relative to this; but the user must thereby translate the actual correction direction and correction size of the point relative to the robot path into corresponding X, Y and Z values of the local reference system.

The correct values to be input can hardly be intuitively determined by the operator since the reference system at the point to be corrected is not visible. In practice, for the most part multiple iterations are required for adaptation of the X, Y and Z values in order to exactly achieve the desired point correction. It is clear that this method has a large potential for error due to its initial imprecision.

It is known to register graphically represented path points by means of an optical system such as a light intersection sensor, wherein an adaptation of path points of the robot program ensues via graphical editing and, for changes to graphical 2D representations, are converted back into a 3D position change and are transferred into the robot program. However, no support is thereby given to the user with regard to the classification and orientation of a path point to be edited in the course of the robot path.

SUMMARY OF THE INVENTION

An object of the present invention is to provide a user with a simple online correction while avoiding the cited disadvantages, and to provide the user with tools for an intuitive manual correction so that he or she can modify the location of a selected support point matching the local conditions without repeatedly matching the local conditions.

According to the invention, the above object is achieved by a device of the aforementioned type with a device to display at least one local region of a robot path of a robot to support a modification of a location of a support point of the robot path, a device to display the support point to be changed, the path course through this support point and at least one direction through the support point, perpendicular to the path course; and a device to modify the path course. To achieve the above object, the invention furthermore provides a method of the aforementioned type in which at least one local region of a robot path of a robot (said robot path provided by the robot program) is adapted to support a change of a location of a support point; and the support point to be changed, the path course through this and at least one direction through the support point perpendicular to the path course are displayed; and wherein the robot program is automatically correspondingly adapted after changing the displayed elements of the robot path.

With the invention, path or support points are read out from the robot program and indicated to the user for online adaptation by means of graphical assistance elements, such that a modification via graphically oriented editing can occur. The conversion between different coordinate systems is taken away from the user, which leads to a distinct reduction of the robot operation complexity.

In a preferred embodiment, the path course is presented as tangent to the robot path at the support point, so a simple and clear representation is provided.

In an additional preferred embodiment, it is provided that a plane perpendicular to the path course is displayed, wherein in particular the plane is displayed at least as a circular disc. In a development of this, it can be provided that the plane is displayed as an outer ring with an offset inner circular disc. Through this presentation, the user is enabled to specify the direction change of the location of the support point to be corrected by an angle relative to the cited direction, perpendicular to the path course in the cited plane.

To select a support point to be corrected, in an embodiment of the invention the course of the robot path is initially presented in a primary plane of a Cartesian coordinate system and/or in a selected plane. In order to render a selection more precisely, and if necessary to be remain below undifferentiated or un-discriminated support points in the representation of the entire path course, in an embodiment the representation of the path course can be enlarged.

According to the invention, a shift of the presented circular disc in the direction of its surface normal causes a shift of the support point on the programmed path in the robot control program; that a rotation of the arrow in the plane of the circular disc around its surface normal determines the correction direction in a plane perpendicular to the programmed path; and/or that a shift of the displayed support point along the arrow produces a displacement of the support point in the robot control program, perpendicular to the direction of the programmed path. The device according to the invention is advantageously fashioned in a corresponding manner.

So that the user can also purely intuitively register the position of the robot relative to the path course, it is provided that this is likewise graphically depicted, wherein the position of the robot is presented relative to the path course.

The device according to the invention is fashioned to reproduce the preceding depiction and graphical representations.

DESCRIPTION OF THE PREFERRED EMBODIMENTS

Figure 1:
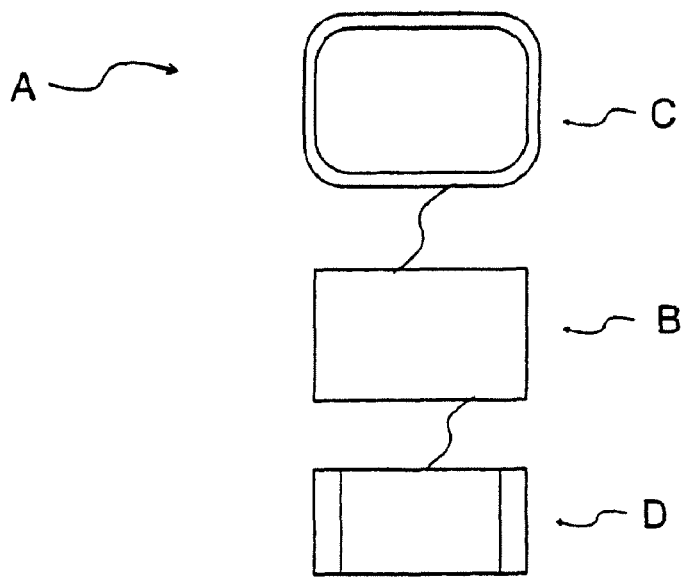
FIG. 1 schematically illustrates an embodiment of a device according to the present invention.

The device A according to the invention essentially has a processing device (computer) B, a display device (C) and at least one input device (D) such as a keyboard (FIG. 1).

Figure 2:
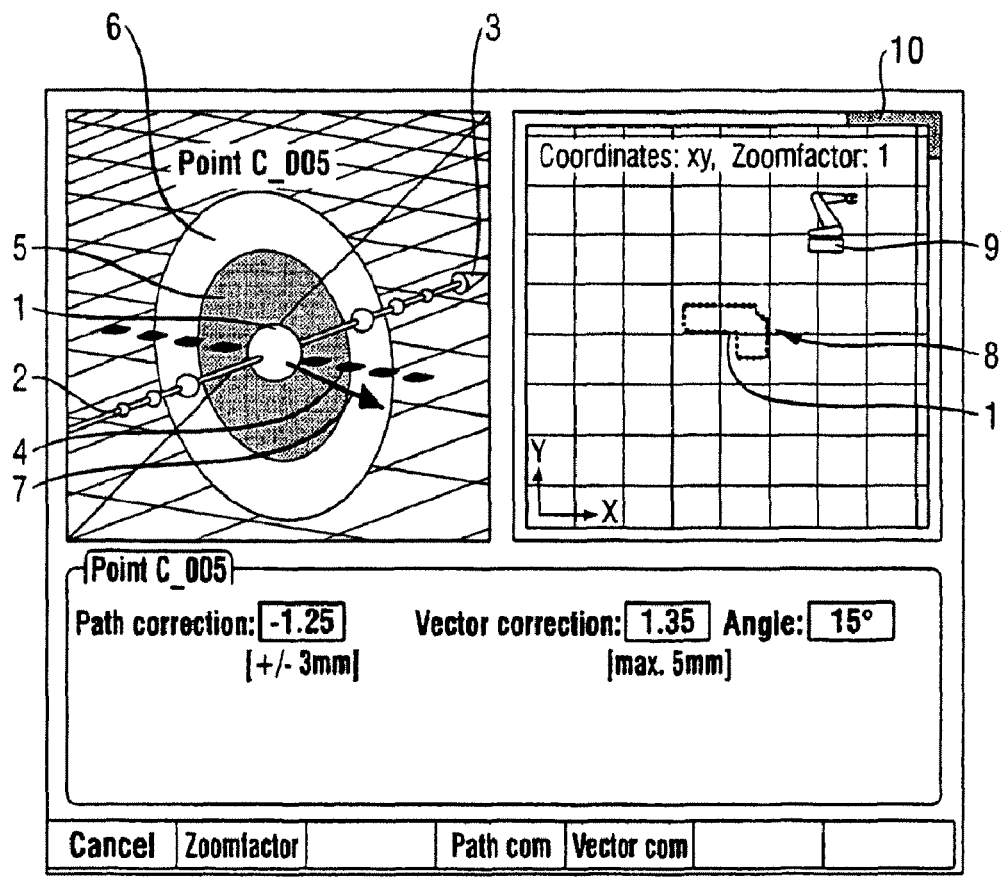
FIG. 2 illustrates display of a local region of a robot path to support modification of the location of a support point, in accordance with the present invention.

To facilitate the correction—in particular the online correction of the support point as it is required for, for example, interpolation of the path course by means of a spline method and was normally taught or even programmed offline—the invention initially provides the depiction of a point to be changed and, as a further tool in addition to this, initially provides a representation for the path course through point 1—in the shown exemplary embodiment, in the form of a tangent 2 relative to the path course through point 1 (FIG. 2). The movement direction is indicated by an arrowhead 3 at the end of the tangent 2.

An artificial line 4 (here a dashed line) through the support point to be corrected at a right angle to the path course or, respectively, the tangent 2 representing this and in the correction plane is shown as an additional orientation aid. This artificial line 4 also forms an "artificial horizon". To illustrate the plane perpendicular to the path course or, respectively, the tangent 2, an inner circular surface 5 is shown through the support point 1 in which the dashed artificial line 4 also lies, as well as circular ring 6 surrounding the surface 5. The shown elements 1 through 6 can be formed with different colors. The circular disc 5 around the support point 2 can in particular indicate the correction limits within which a correction of the location of the support point whose location is to be corrected can be produced. In the shown exemplary embodiment, an arrow that represents the correction direction of the desired spatial correction (aligned at an angle of, for example, 15°) is furthermore designated with 7.

The desired correction can be input via associated keys or as a numerical value in the lower half of the representation from FIG. 1, or even via typical input with the aid of a computer input means (such as a computer mouse) in that the origin point of the arrow 7 is moved along the tangent 2 and the end point of the arrow 7 is moved on the circle representation 5, 6. Located in the lower display field are maximum correction values for the path correction along the path course or, respectively, the tangent 2 (with ±3 mm in the shown exemplary embodiment and with a maximum of 5 mm perpendicular to this), while the angle can be freely selected in the entire plane of the discs 5, 6.

Figure 3:
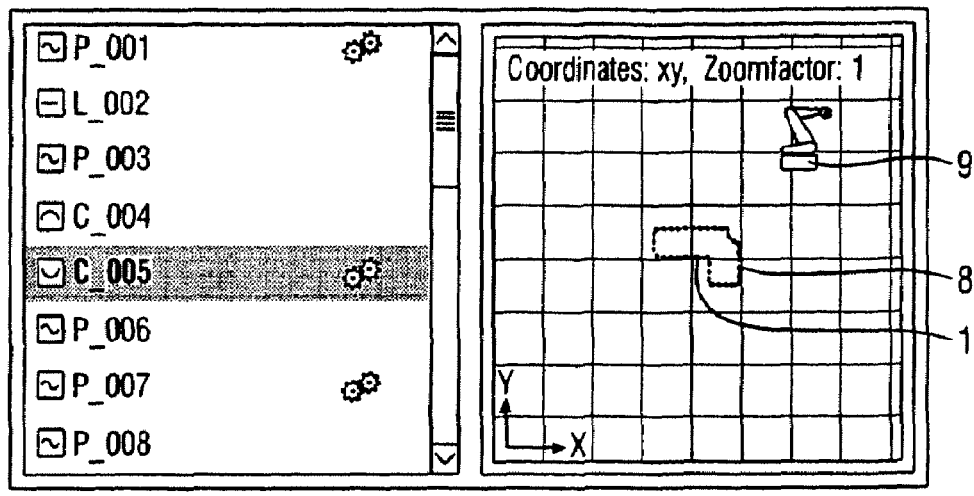
FIG. 3 shows an initial representation at the display for selection of a support point to be corrected in terms of its location with the device of FIG. 1.
Figure 4:
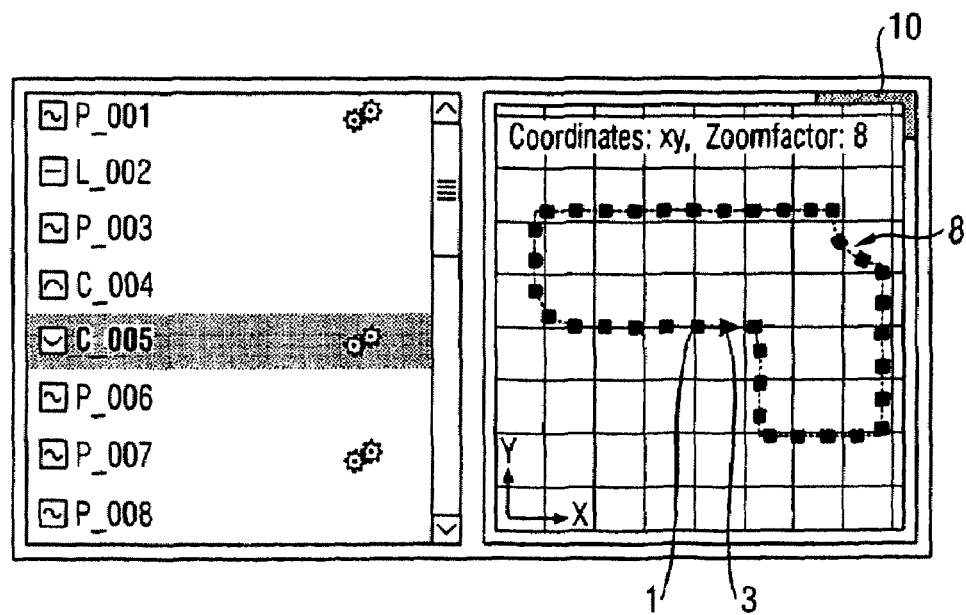
FIG. 4 shows the illustration of FIG. 1, with the path course enlarged.

The selection of the support point to be corrected can be made corresponding to the representations of FIGS. 3 and 4.

The right upper window representation in FIG. 2 shows the path course 8 in the selected correction plane, here in the X-Y plane of a Cartesian coordinate system (as is indicated in the left lower corner of this window representation). On the path course, the support point 1 (FIG. 2) to be corrected (which is selected from a point list in the left window portion in FIG. 2), which is designated with C_005, for example, is selected and emphasized. Furthermore, the position of the robot 9 is represented by a schematic depiction of such a robot 9 relative to the path course 8.

The representation of the path course can be enlarged, as this is presented in FIG. 3. Furthermore, given such an enlargement the movement direction can be reflected by an arrow 3 corresponding to FIG. 2. The location of the robot 9 relative to the path course 8 is represented by a marking 10 at the edge of the presentation region in the enlarged depiction of FIG. 3. Depending on the orientation of the location of the robot relative to the path course 8, the marking can migrate around the presentation region for the path course 8, thus also be located at a different location than shown in FIG. 3.

The invention supports the operating mode of a user for correction of a support point or multiple support points of the movement path of a robot in the following manner:

First, according to FIG. 3 the user calls up the symbolic representation (left half) and graphical representation of the path course 8 with the individual support points. He then selects a support point 1, be it in the symbolic reproduction to the left, be it on the graphical path course to the right. The user can then produce an enlargement of the path course via zooming. Furthermore, it is possible to show the path course not only in the reproduced X-Y plane of the Cartesian coordinate system but also in other primary plane of such a Cartesian coordinate system or in other desired planes, depending on which representation is most suitable for correction of the location of a support point.

If necessary, an enlargement of the depiction of the path course 8 can be effected in order to select for correction a different support point than that initially selected, if this appears to be necessary or more suitable in the enlarged depiction. A switch from the left symbolic representation to the graphical depiction in the left region of FIG. 2 then ensues, and the user can then produce a correction of the location of the selected support point 1 in the manner described above.

Since the two-dimensional reproduction in the right area of FIG. 2 through 4 contains a projection of the path course on the corresponding coordinate plane, it is not to be excluded that a point located in this reproduction actually represents two points in a path course, or, respectively, that these are no longer to be differentiated or, respectively, discriminated in the reproduction. If this is the case, in the representation from FIG. 1 the arrowhead 3 is not displayed as well, which indicates to the user that the path support point 1 shown there is not unambiguous and provides him with an inducement to select a different plane as a presentation or, respectively, projection plane in which the two points in question are differentiable.

Figure 5A:
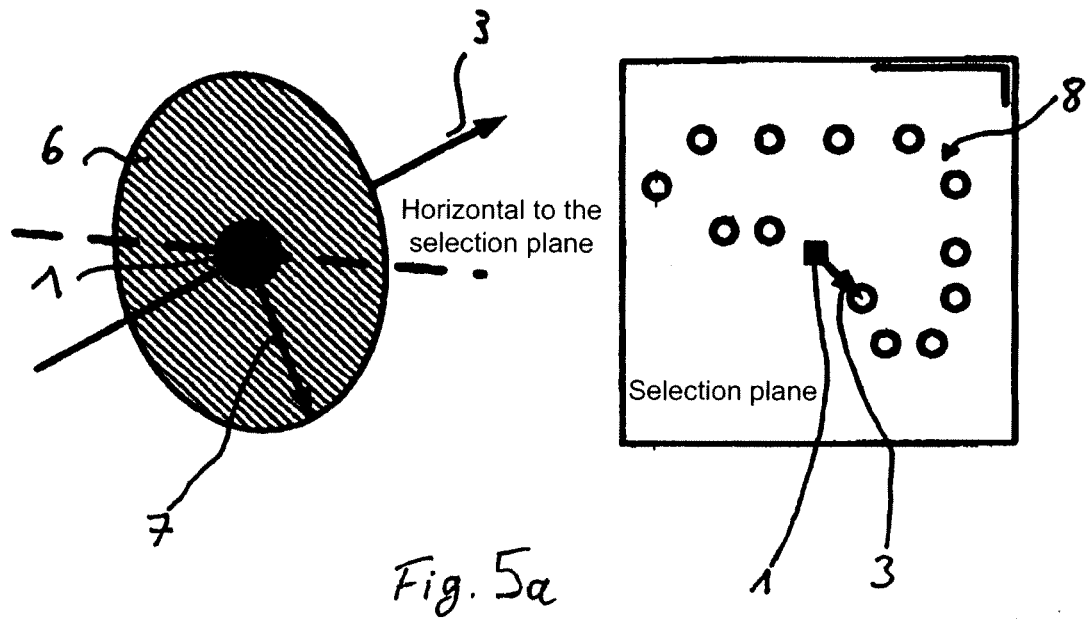
FIGS. 5a and 5b respectively illustrate the use of the device according to the invention to display steps in the method according to the invention.
Figure 5B:
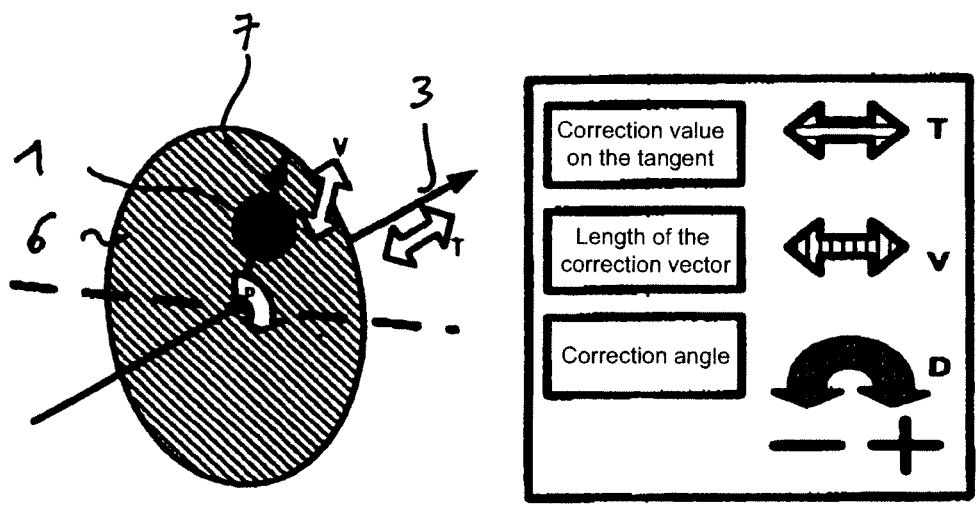

The disc 6 of FIGS. 5a and 5b schematically represents the tolerance range for a correction. The arrow 7 on the disc 6 symbolizes only the correction device. The length of the arrow does not vary.

After a correction, the middle point 1 in the graphic wanders outward on the arrow 7 (disc). The middle of the disc 6 represents the nominal point. The correction values are stored in offset data with reference to the nominal point. The disc edge thus represents the tolerance limit of the correction.

A correction ensues via colored, associated or otherwise differentiated arrows. For this the device according to the invention respectively possesses one + and one − key per correction device. A numerical input is likewise additionally possible.

Although modifications and changes may be suggested by those skilled in the art, it is the intention of the inventors to embody within the patent warranted heron all changes and modifications as reasonably and properly come within the scope of their contribution to the art.

The invention claimed is:

1. In a system for operating a robot according to a robot control program, the improvement of a device for processing said robot control program comprising:
   a processor configured with an operating program to operate a robot online operating program is executed;
   a display screen;
   said processor configured to display an online representation while said operating program is executed, at said display screen, of at least one local area of a robot path of said robot while said operating program is executed, defined by said operating program, said robot path comprising at least one support point therein;
   said processor being configured to also display online, while said operating program is executed, at said display screen, said support point, as a support point to be modified and being configured to display a path course of said robot path through said support point and to simultaneously display at least one direction proceeding through the support point perpendicularly to said path course; and
   a user interface connected to said processor allowing a user to interact with said processor online, while said operating program is executed, to manually modify said path course on said display screen online during execution of said operating program in said processor, by modifying said support point on said display screen, thereby to modify said robot path online while said operating program is executed.

2. The system of claim 1 wherein said processor is configured to depict said path course at said display screen as a tangent of said robot path at said support point.

3. The system of claim 1 wherein said processor is configured to also depicting a plane perpendicular to said path course at said display screen.

4. The system of claim 3 wherein said processor is configured to depict said plane as a circular disc.

5. The system of claim 1 wherein said processor is configured to allow selective enlargement of the representation of said robot path at said display screen in a primary plane of a Cartesian coordinate system, or in a selected plane.

6. The system of claim 5 wherein said processor is also configured to selectively enlarge the representation of said path course at said display screen.

7. The system of claim 5 wherein said processor is configured to also depicting a representation of a position of the robot relative to the path course at said display screen.

8. The system of claim 5 wherein said processor is configured to depict a direction of a position of the robot relative to the path course by a marking located at an edge of a presentation region of said display screen.

9. The system of claim 1 wherein said processor is configured to allow displacement, in response to an input entered via said user interface, of the support point toward a programmed path in said robot control program.

10. The system of claim 9 wherein said processor is configured to depict a plane, formed by a circular disc perpendicular to said programmed path, by rotation, via said user interface, of an arrow in said circular disc, around a surface normal of said circular disc.

11. The system of claim 10 wherein said processor is configured to cause displacement, via said user interface, of said support point along said arrow in a direction of an offset of said support point perpendicular to said programmed path.

12. A method for operating a robot according to a robot control program comprising the steps of:
   automatically operating a robot online, while an operating program for the robot is being executed, from a processor according to said operating program executed in the processor;
   from the processor, automatically displaying an online representation, while said operating program is executed, at a display screen, of at least one local area of a robot path of said robot, while said operating program is executed, deferred by the operating program, said robot path comprising at least one support point therein;
   also automatically displaying online, while said operating program is executed, at said display screen, said support point, as a support point to be modified and displaying a path course of said robot path through said support point and simultaneously displaying at least one direction proceeding through the support point perpendicularly to said path course; and
   via a user interface connected to said processor, allowing a user to interact with said processor online, while said operating program is executed, to manually modify said path course on said display screen online during execution of said operating program , by modifying said support point on said display screen, thereby to modify said robot path online.

13. The method of claim 12 comprising depicting said path course at said display screen as a tangent of said robot path at said support point.

14. The method of claim 12 comprising also depicting a plane perpendicular to said path course at said display screen.

15. The method of claim 14 comprising depicting said plane as a circular disc.

16. The method of claim 12 wherein comprising allowing selective enlargement of the representation of said robot path at said display screen in a primary plane of a Cartesian coordinate system, or in a selected plane.

17. The method of claim 16 comprising also selectively enlarging the representation of said path course at said display screen.

18. The method of claim 16 wherein comprising also depicting a representation of a position of the robot relative to the path course at said display screen.

19. The method of claim 16 wherein comprising depicting a direction of a position of the robot relative to the path course by a marking located at an edge of a presentation region of said display screen.

20. The method of claim 12 comprising allowing displacement, in response to an input entered via said user interface, of the support point toward a programmed path in said robot control program.

21. The method of claim 20 comprising depicting a plane, formed by a circular disc perpendicular to said programmed path, by rotation, via said user interface, of an arrow in said circular disc, around a surface normal of said circular disc.

22. The method of claim 21 comprising causing displacement, via said user interface, of said support point along said arrow in a direction of an offset of said support point perpendicular to said programmed path.

* * * * *